United States Patent
Ruetten et al.

(10) Patent No.: US 8,546,765 B2
(45) Date of Patent: Oct. 1, 2013

(54) HIGH DYNAMIC RANGE X-RAY DETECTOR WITH IMPROVED SIGNAL TO NOISE RATIO

(75) Inventors: Walter Ruetten, Linnich (DE); Lex Alving, Mierlo (NL); Thomas Frederik Buss, Tilburg (NL); Tiemen Poorter, Eindhoven (NL); Peter Bas Anton Wolfs, Veldhoven (NL)

(73) Assignee: Trixell, Moirans (FR)

( * ) Notice: Subject to any disclaimer, the term of this patent is extended or adjusted under 35 U.S.C. 154(b) by 18 days.

(21) Appl. No.: 12/997,891

(22) PCT Filed: Jun. 19, 2009

(86) PCT No.: PCT/IB2009/052640
§ 371 (c)(1),
(2), (4) Date: Dec. 14, 2010

(87) PCT Pub. No.: WO2009/156927
PCT Pub. Date: Dec. 30, 2009

(65) Prior Publication Data
US 2011/0108735 A1      May 12, 2011

(30) Foreign Application Priority Data
Jun. 26, 2008  (EP) ..................................... 08104548

(51) Int. Cl.
*G01T 1/24*    (2006.01)
(52) U.S. Cl.
USPC .................................... 250/371; 250/370.09
(58) Field of Classification Search
USPC ................................................. 250/370.09
See application file for complete search history.

(56) References Cited

U.S. PATENT DOCUMENTS

| | | | |
|---|---|---|---|
| 6,163,029 A | 12/2000 | Yamada et al. | |
| 6,243,441 B1 | 6/2001 | Zur | |
| 6,486,808 B1 | 11/2002 | Seppi et al. | |
| 7,002,408 B2 | 2/2006 | Roos et al. | |
| 2003/0011694 A1 | 1/2003 | Dierickx | |
| 2006/0065844 A1* | 3/2006 | Zelakiewicz et al. | 250/370.09 |
| 2006/0231875 A1 | 10/2006 | Patrick et al. | |

FOREIGN PATENT DOCUMENTS

| | | |
|---|---|---|
| DE | 3531448 A1 | 3/1986 |
| DE | 102005020503 A1 | 11/2006 |
| JP | 2004080514 | 3/2004 |
| WO | 2005039039 A2 | 4/2005 |
| WO | 2005107242 A1 | 11/2005 |

* cited by examiner

*Primary Examiner* — Marcus Taningco
(74) *Attorney, Agent, or Firm* — Baker & Hostetler LLP

(57) ABSTRACT

An x-ray detector and its pixel circuit are described, that allow to cover a large dynamic range with automatic selection of the sensitivity setting in each pixel, thus providing improved signal to noise ratio with all exposure levels. X-ray detectors are required to cover a large dynamic range. The largest exposure determines the required pixel capacitance. However, a large pixel capacitance gives a bad signal to noise ratio with small exposures e.g. in the dark parts of the image. This invention disclosure describes several approaches to provide automatic sensitivity selection in the pixels. This ensures that low signals are stored in a small capacitor or read out with a high sensitivity with corresponding good signal to noise ratio, while larger signals are stored in larger capacitors or are read out with lower sensitivity so that no information is lost.

10 Claims, 19 Drawing Sheets

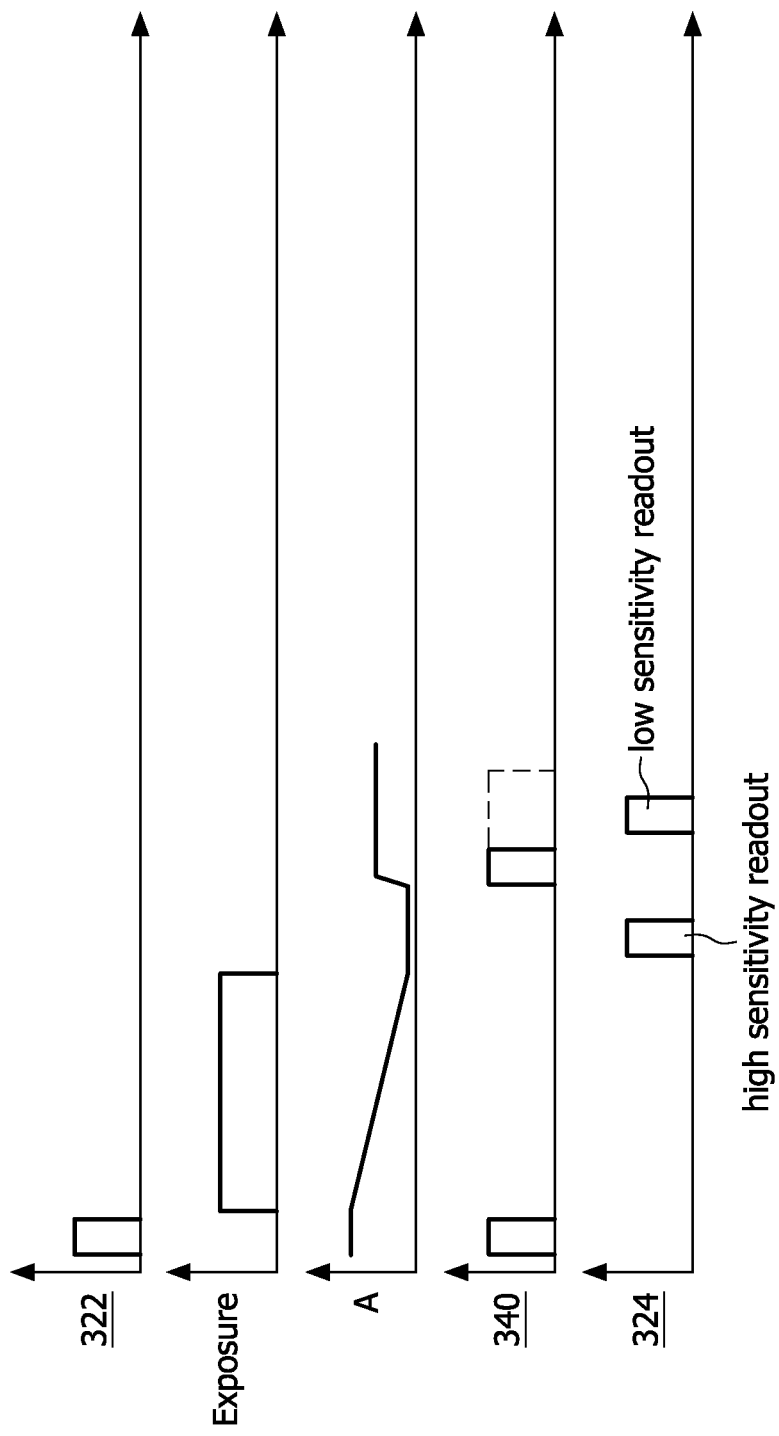

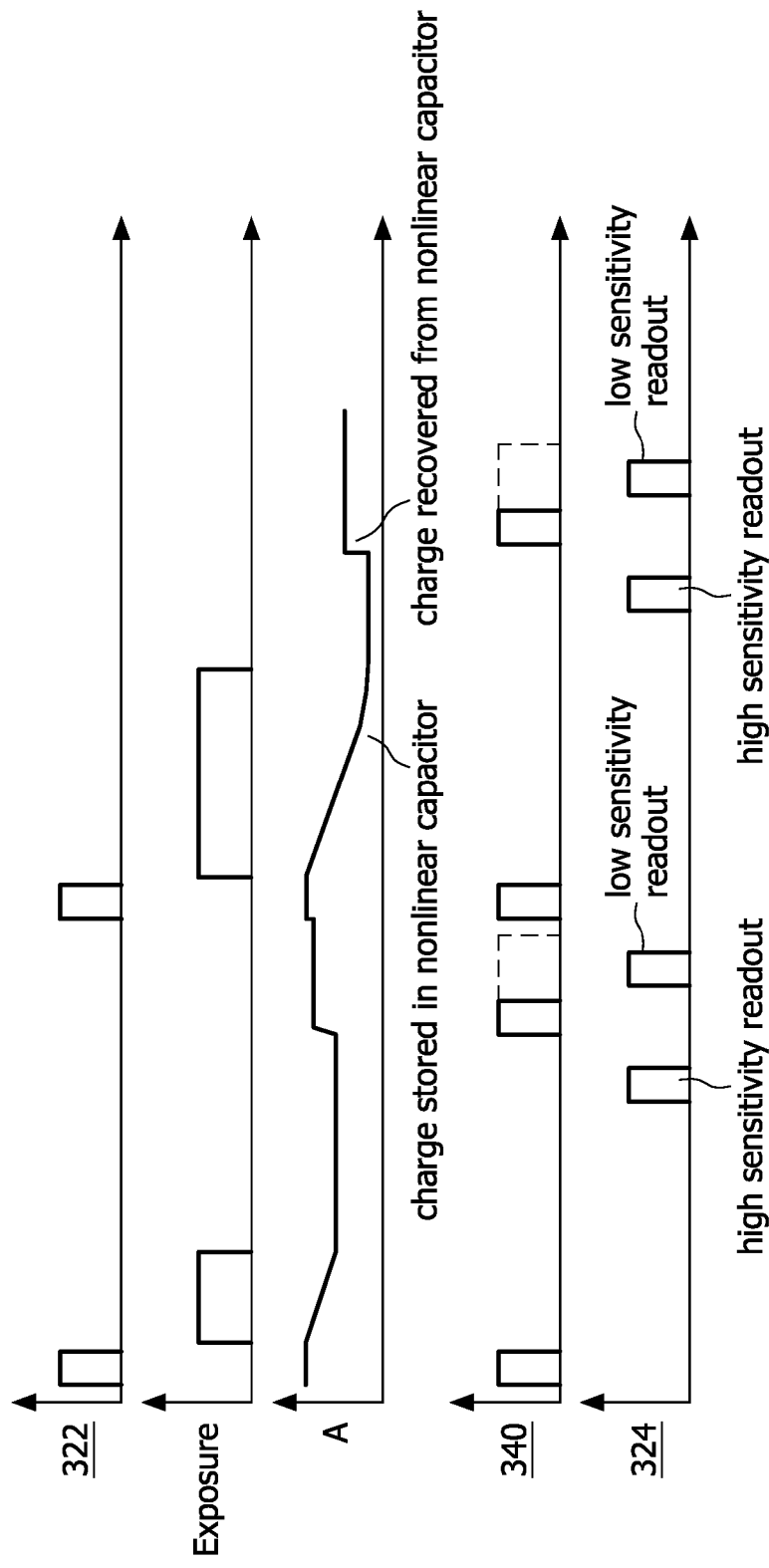

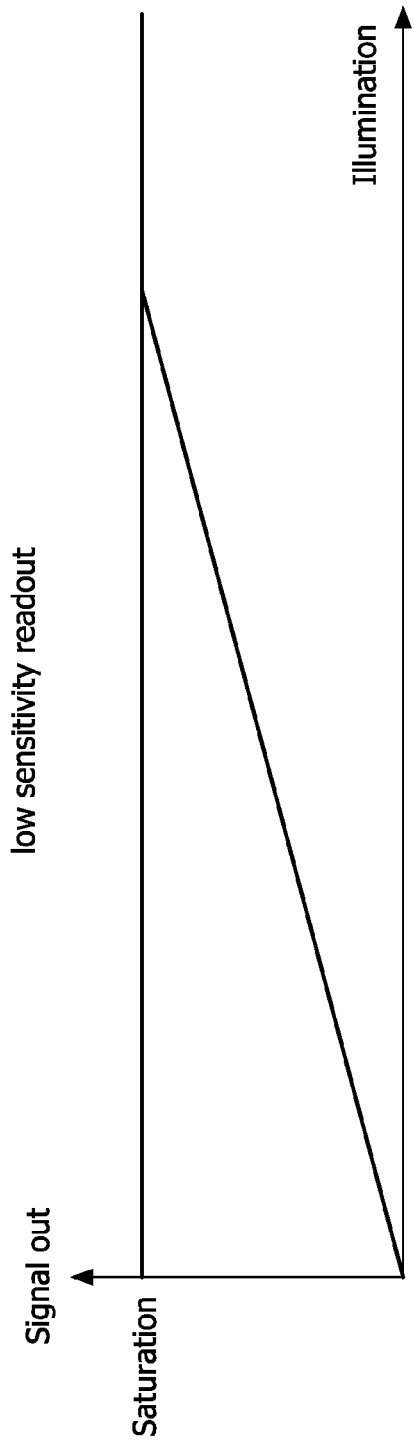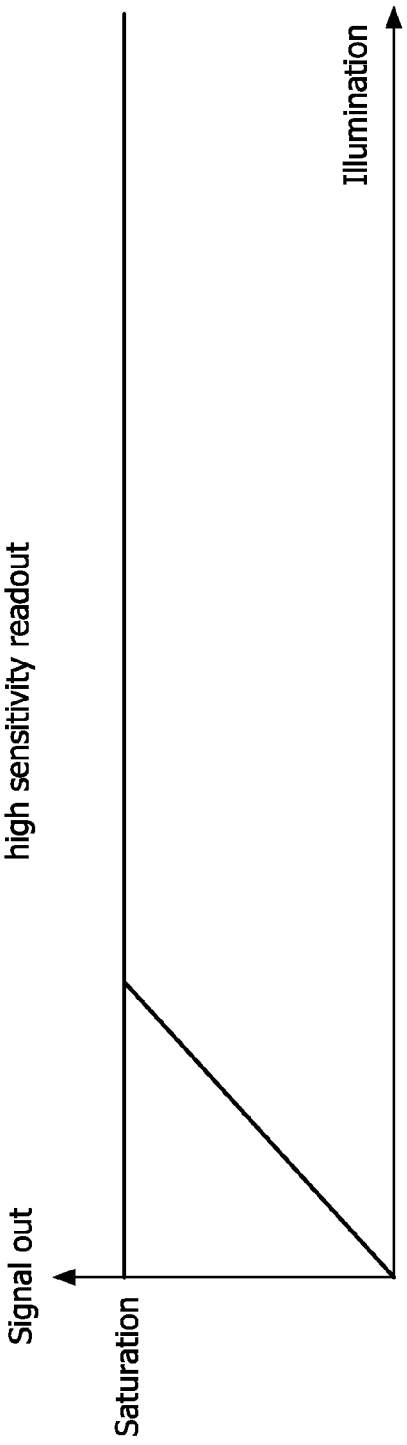

HIGH DYNAMIC RANGE X-RAY DETECTOR WITH IMPROVED SIGNAL TO NOISE RATIO

FIELD OF THE INVENTION

The present invention is related to a detector for electromagnetic radiation, especially x-rays and in particular to a x-ray detector panel which provides a high dynamic range with an improved signal to noise ratio.

BACKGROUND OF THE INVENTION

X-ray converters transform x-ray radiation into optical photons either using the indirect conversion with scintillators, by converting x-ray radiation into light or directly conversation into electron-hole pairs by using direct conversion photoconductors. The signal from the x-ray converter is sensed by a matrix of sensor elements which are typically arranged in a 2 dimensional pixel matrix or grid. Each pixel may contain a collection device for the signal in form of e.g. a photodiode to convert the optical photons into electrons, a photo gate, photo conductor or an electrode to collect the electrons or holes directly. In any case, the signal is finally stored on a capacitance in the pixel before it is read out. Resetting the storage capacitor before taking the image as well as the components involved in the readout process both contribute to electronic noise which is added to the signal. Consequently, the available signal to noise ratio is degraded.

X-ray detectors are often required to accept a large range of signals in the same image, e.g. strongly attenuated signals that have passed through dense material and direct radiation that has not gone through any material.

In order to allow correct detection of the strongest radiation, a low sensitivity setting or the low sensitivity range setting has to be chosen, with disadvantageous effect on the signal to noise ratio. In most prior art detectors, the sensitivity setting is commonly valid for all of the pixels of the detector. Mostly the amplifier or readout stage of the pixel, which is mostly formed as a source follower sampling the voltage of the capacitance of the sensor device has a limited dynamic range.

The limitation of the dynamic range forces the user to select an even lower sensitivity to avoid saturation of the readout chain.

The low sensitivity setting implies that weak radiation levels will only give small signals which are actually disturbed by the unavoidable readout noise i.e. reset noise on the storage capacitor and noise added in the readout stages.

If a higher sensitivity setting would be available in regions where only small radiation levels are present, then the signal to noise ratio would be greatly improved, hence image quality would be better.

The US Patent Application Number 2006/0231875 A1 discloses an imager with dual conversion sensitivity charge storage. A dual conversion sensitivity element (e.g., Schottky diode) is coupled between a floating diffusion region and a respective capacitor. The dual conversion sensitivity element switches in the capacitance of the capacitor, in response to charge stored at the floating diffusion region, to change the conversion sensitivity of the floating diffusion region from a first conversion sensitivity to a second conversion sensitivity. In an additional aspect, the exemplary embodiments provide an ohmic contact between the gate of a source follower transistor and the floating diffusion region which assists in the readout of the dual conversion sensitivity output signal of a pixel.

The U.S. Pat. No. 6,486,808 discloses a preamplifier stage with dynamically controllable signal sensitivity in a data signal processing circuit that includes a downstream analog-to-digital signal converter. The level of the data signal subsequent to its preamplification is monitored and the sensitivity of the preamplifier stage is dynamically adjusted in response to such data signal transcending one or more predetermined thresholds. Hence, the effective dynamic range of the preamplifier stage is extended, thereby also effectively extending the dynamic range of the overall system beyond that to which it would have otherwise been limited by the dynamic range of the analog-to-digital signal converter. Such a preamplifier is used in an x-ray imaging system such as that using flat panel solid state imaging devices.

SUMMARY OF THE INVENTION

It is the objective of the present invention to improve a pixel sensor device with a more flexible dynamic range.

This objective is achieved by the features of the present claim 1 as a radiation detector pixel for x-ray radiation, comprising a sensor device, providing at least one automatic sensitivity range controlling device controlling the conversion of incoming electromagnetic radiation into an electric output quantity, and at least two sensitivity ranges, wherein the characteristic curve is continuous across the operational range.

The operational range of the acquired signal extends from the absence of any illumination on the detector during acquisition until the saturation of the acquisition on the detector. The saturation point is reach when additional illumination does not longer increase the output signal of the detector.

The electric output quantity can either be an output voltage or the quantity of electric charge.

In prior art the principle of using a high dynamic range for imagining by for example combining two characteristic operating curves is a well known method that is used in optical sensors. With reference with reference to the US Patent 2006/02 31875 A1 the characteristic curves of the therein describe detector pixel is a combination of a first characteristic curve with a first inclination and the second characteristic curve with a second inclination, and wherein the crossing of the first and second characteristic curve provides a non continuously operating point, hence there is a inaccuracy in respect to the crossing point of both of the operation characteristic curves, that the lead to an inconsistency in the overall operation characteristic curves of the sensor device in and nearby the crossing point. Further uniformity of the crossing point characteristic for all pixels is hard to achieve.

But those methods are not appropriate for using an x-ray imaging, because an x-ray image provides a much larger contrast range than an image in the visual range. To be appropriate for an application of the sensor in medical x-ray imagining due to diminishing the expose for the patient to harmful x-ray radiation the loss of information must be avoided.

In the present invention the selection of the dynamic range during the exposure time is done automatically which advantageously allows an uninterrupted exposure and the subsequent choice of the suitable dynamic range without the loss of picture information during the exposure.

In order to achieve the suitable miniaturization of the device it is advantageous to use the photo sensor device which itself provides capacitance and at least one capacitance according to claim 2, which can be easily implemented in a detector pixel, therefore the present invention provides a radiation detector pixel, wherein the sensor device comprises a photo sensor device and at least one capacitance.

Advantageously in some embodiments an actuator device is provided for manual or automatic shifting of electric charges between a first and a second capacitance to provide at least two sensitivity ranges according to claim 3, which provides a radiation detector pixel, wherein the radiation detector pixel provides at least one actuator device as an automatic sensitivity range controlling device. This allows achieving images of different sensitivities, i.e. a low and high sensitivity range image, during the exposure time and to later and allowing the user to choose the image that best suits his needs.

The actuator device may be in the simplest case a switch, but advantageously any kind of transistor may be used, preferably a field effect transistor, because this can be easily implemented in the wafer design of the pixel device. Since in case of a failure, the actuator device is implemented in every single pixel, and not in every single line, as it is done in prior art, the loss of one actuator device will cause of the loss of one pixel and not of a whole line of pixels. Accordingly claim 4 provides a radiation detector pixel, wherein the actuator device is a FET or any other type of transistor.

The actuator device may be implemented as a switch with two switching states, but preferably the actuator device will be used at charge pump or a kind of an automatic valve, which automatically transfers overflowing charge from a first capacitance to a second capacitance only during the exposure time.

In some embodiments amplifying devices provided, which on the one hand allow the amplification of the sampled electric charge and on the other hand allow and separation of the image reception and image sampling. This is advantageously for noise reduction as well as to allow the time independent sampling of the information of the pixel device according to claim 6, wherein in the pixel at least one amplifying device is controlling the sensitivity range of the pixel output voltage.

Further advantageously the combination according to claim 7, wherein the charge pump circuit is coupled with at least one sample and hold circuitry, allows to combine the advantages of the actuator device in form of the charge pump circuit, in which no information, which is gained during the exposure time is lost during the readout time and the advantages of a sample and hold circuitry, that allows to handle the readout time independently from the exposure time.

The present invention is advantageous, because providing at least one capacitance in each of the pixels makes the operation of each single pixel autonomously which provides a better reliability of the whole device. Further, the present invention is advantageous, because of using and a FET or any other type of transistor in connection to the photo sensor capacity or further capacitances as an automatic charge pump, because this inhibits the overflow of one of the capacitors and therewith the loss of information gained during the exposure. Hence, this allows the automatic adjustment of the dynamic range during the exposure in order to provide several dynamic ranges to allow the operator to make the best possible choice in view to the optimizing of the exploitation of the dynamic range and optimizing to the noise levels.

Additionally further the present invention provides a radiation detector system with at least one radiation detector pixel for x-ray radiation according to claim 1.

Further the present invention discloses a method for detecting electromagnetic radiation with a detector pixel for x-ray radiation, comprising:

sensing of an exposure of electromagnetic radiation, storing charge on a photodiode and at least one capacitor with linear storage capacity and at least one capacitor with and non-linear storage capacity, sampling the stored charge of the at least one capacitor to an at least one sample-and-hold capacitor, charging of at least a further capacitor with the stored charge, sampling the stored charge of the at least one and further capacitor to an at least one sample-and-hold capacitor, reading out the stored charge to sample-and-hold capacitor in high sensitivity range mode, reading out the stored charge to sample-and-hold capacitor in low sensitivity range mode.

The present invention provides an advantaged detection of low and high sensitivity range of electromagnetic radiation, where in the first selection of radiation in the low sensitivity with a small capacitors reduces the noise, and by the automatic or manual switch over to the bigger capacitor allows to have a second range of radiation sensitivity wherein a noise level is tolerable, but allows to have a high contrast image. Further, this allows the use the information of one and the same exposure several times without discarding picture information of the x-raying of the subject.

In a preferred embodiment, the present invention allows not only to achieve the pre-described advantages, but it provides the combination of a sample-and-hold circuit to minimize the read out time, by charging the sample-and-hold capacitor. This allows providing the exposure step in parallel to the read out step of at least one sensitivity range. This advantageously saves time for taking exposures and minimizes the exposure of a subject to x-ray radiation.

The present invention discloses the method for detecting electromagnetic radiation with a detector pixel for the x-ray radiation, comprising a combination of the three latter methods.

The present invention discloses a computer program for controlling the radiation detector system, which provides control signals for controlling the pixel circuitry with multiple operation sensitivity ranges.

And additionally further the present invention provides a medium comprising a computer program for controlling so radiation detector system, which provides control signals for controlling the pixel circuitry with multiple operation sensitivity ranges.

It is also possible to apply the present invention to indirect and direct x-ray converters, and also to optical imaging.

BRIEF DESCRIPTION OF THE DRAWINGS

The invention will be described in more detail hereinafter with reference to examples of embodiment but to which the invention is not limited.

FIG. 3b is a signal timing diagram of timing and control signals for the circuit of FIG. 3a;

FIG. 4b is the signal timing diagram of timing and control signals for the circuit of FIG. 4a;

FIG. 5b is the signal timing diagram of timing and control signals for the circuit of FIG. 5a;

FIG. 6b is the signal timing diagram of timing and control signals for the circuit of FIG. 6a;

FIG. 7b is the signal timing diagram of timing and control signals for the circuit of FIG. 7a;

FIG. 8b is the signal timing diagram of timing and control signals for the circuit of FIG. 8a;

FIG. 9b is the signal timing diagram of timing and control signals for the circuit of FIG. 9a.

FIG. 11a and FIG. 11b show schematically two charts of illumination vs. outgoing signal according to the present invention.

DETAILED DESCRIPTION OF EMBODIMENTS

Figure 1:
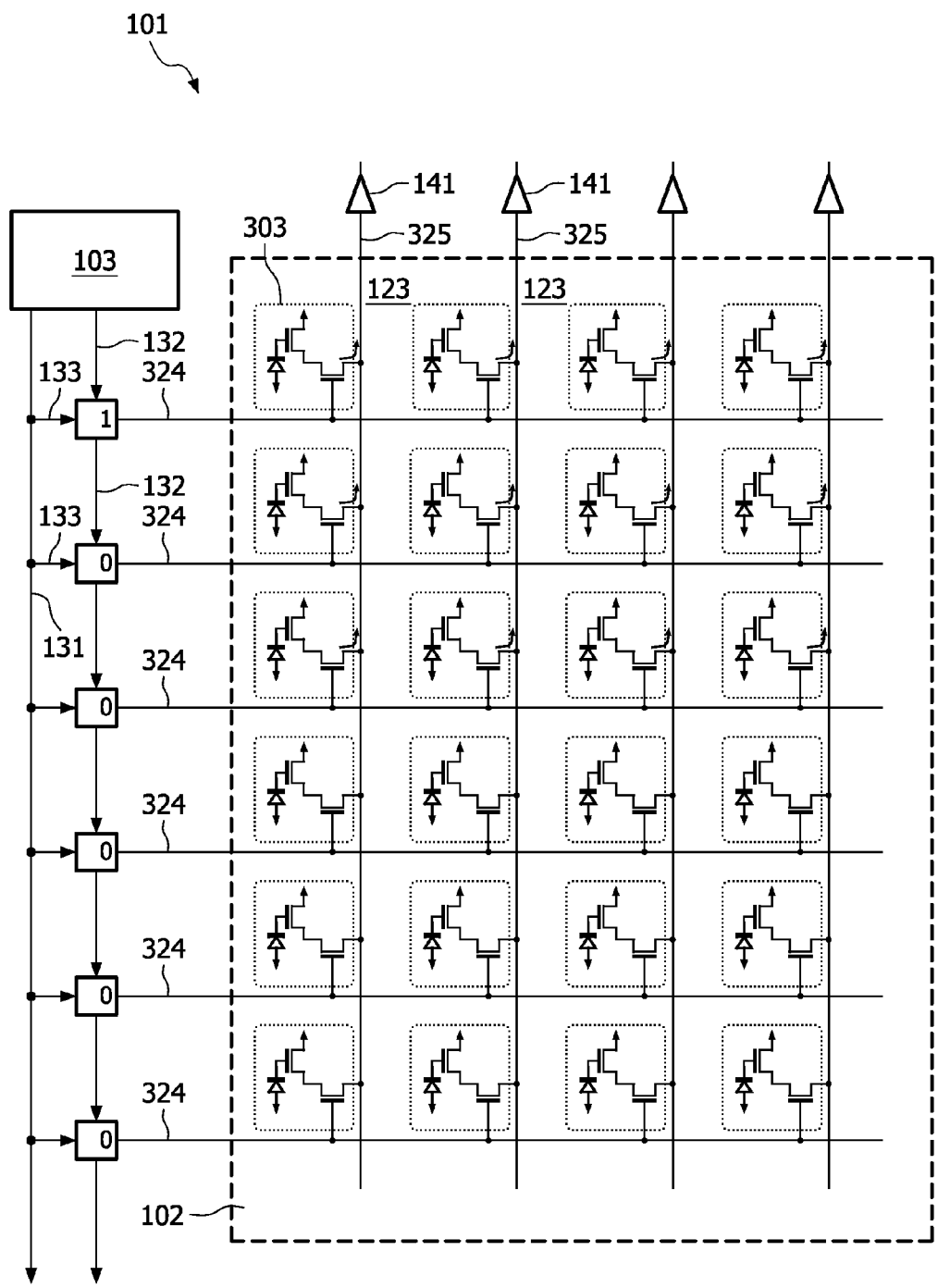
FIG. 1 is a schematic diagram of a flat panel x-ray detector according to prior art.

The illustrations in the drawings are schematically. In different drawings, similar or identical elements are provided with the same reference signs.

FIG. 1 shows a typical example for a flat panel x-ray detector, which consists of the pixel matrix 102 composed of pixels 303. Rows are selected for readout by means of a shift register 133 that drives row select lines 324. Voltage values from the pixels 303 are read out in columns 325 and directed to the amplifiers 141. The data information gained from the amplifiers 141 is now combined column by column to one image. Control lines for controlling the pixel operation are preferably running along at one side of the pixel matrix and so to allow putting several pixel matrixes together. Hence, the pixel matrixes may be organized in rows and columns, for example by being arranged in a regular (rectangular or hexagonal) grid like tiles, in order to achieve larger detector surfaces.

The radiation in the present invention may be any kind of electromagnetic radiation e.g. light or x-rays. The sensor device is a combination of a photo sensor device, e.g. a photo diode, photo gate or photo conductor. Since a sensor device in practice has a parasitic capacitance, the sensor element inherently provides capacitance, but in some embodiments the sensor element may be formed as a combination of a photo sensor connected parallel to a capacitance.

Thus, a sensor device comprises a photo sensor device and at least one capacitance, wherein the capacitance also could be provided by the inherent capacitance of the photodiode, photo conductor, etc. In the prior art literature the term high gain range or low gain range and used determining a high sensitivity range or low sensitivity range, respectively, thus the terms gain range and sensitivity range should be regarded as synonyms for this description.

Figure 2:
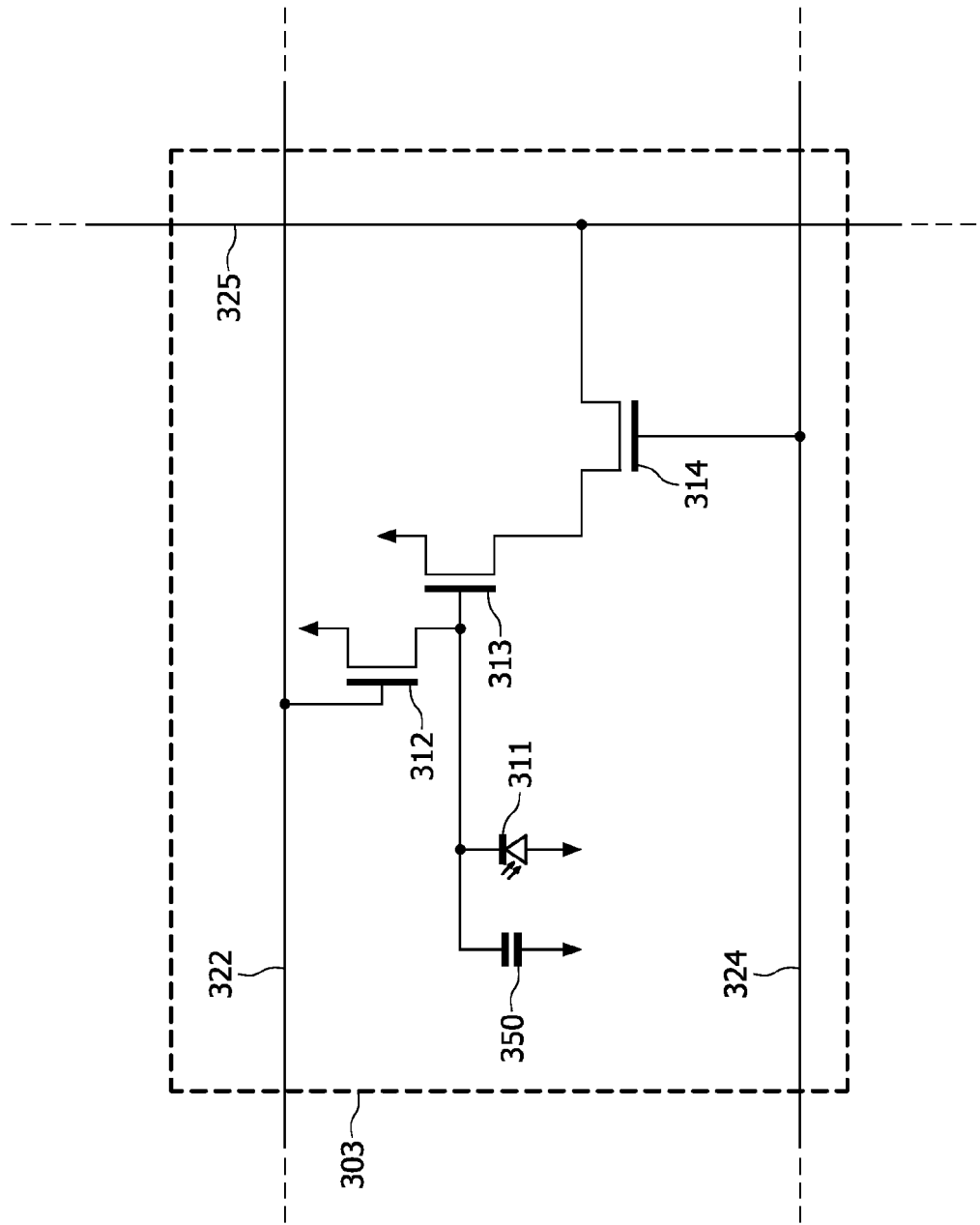
FIG. 2 is schematic diagram of a pixel cell according to prior art.

FIG. 2 provides an embodiment of a prior art pixel cell. In the pixel a sensor device and several components are provided. A reset switch 312 charges the photodiode to a well known state. The light (optical photons) coming from the scintillator is converted by the photodiode 311 into charge. The x-rays may also be directly converted by a photo conductor. The additional charge is added to the charge stored on the capacitance of the photo diode itself and/or on an optional, dedicated pixel capacitor 350 and thus, the charge and the voltage over the photodiode/pixel capacitance changes.

Source follower 313 makes a replica of this voltage available at its source. If the readout switch 314 is activated by row select lines 324, the replica of the photodiode voltage is made available to the amplifiers at the matrix periphery to provide the image.

Figure 3A:
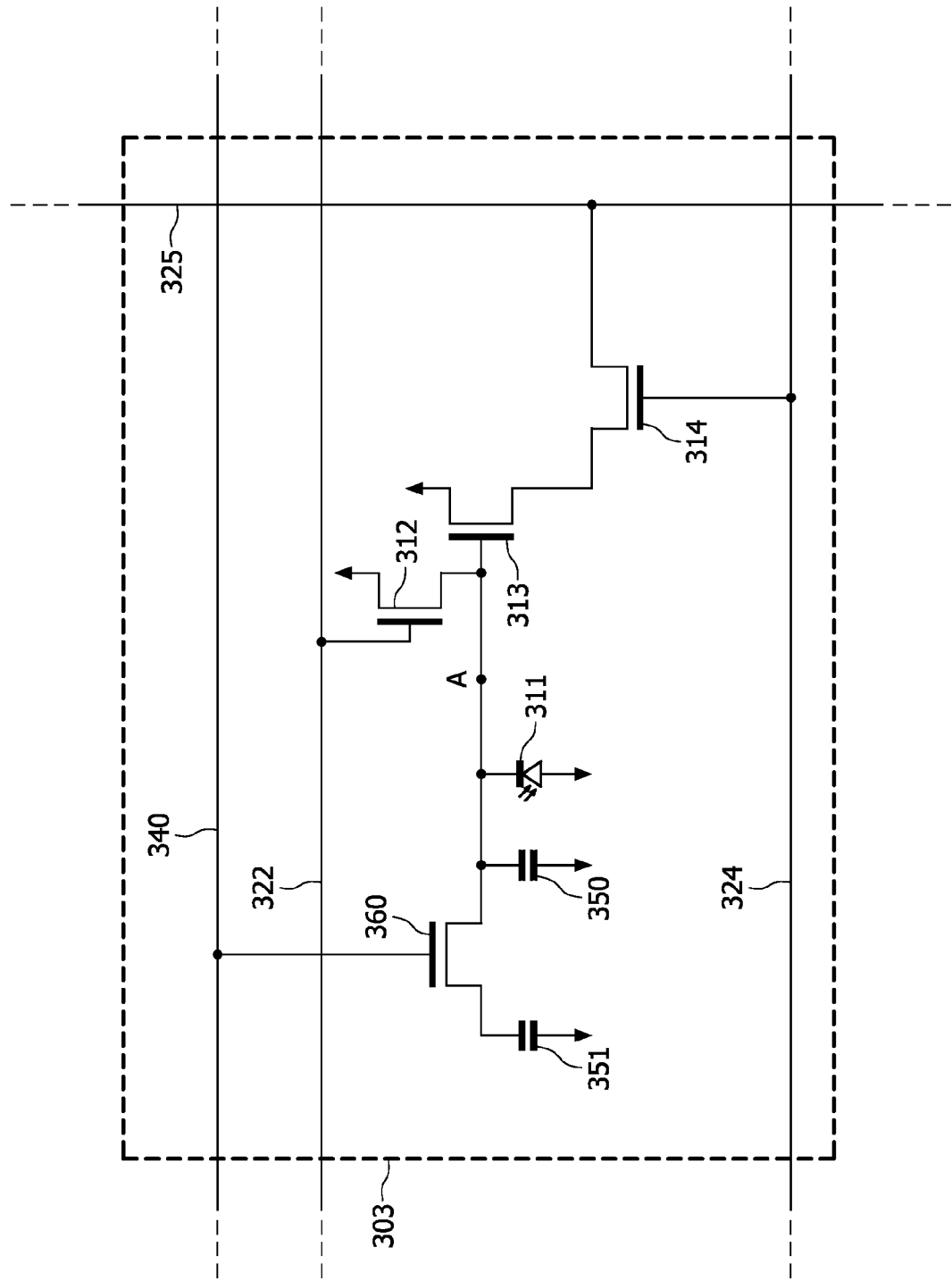
FIG. 3a is a first implementation of a high dynamic range x-ray detector pixel according to an embodiment of the present invention.

FIG. 3a shows a first implementation of a high dynamic range pixel. In this description it is assumed, that the voltage amplitude deviation or voltage swing on the photodiode 311 and pixel capacitance is larger than the voltage swing acceptable to the readout amplifier 313. Also referring to FIG. 3b, the photodiode 311, pixel capacitor 350 and low sensitivity capacitor 351 are reset prior to readout. Switch 360 is opened prior to exposure. The charge collected during exposure leads to a voltage drop on node A. If the voltage drop is small enough (low exposure), it will pass through the readout amplifier 313 on the first, high sensitivity range readout. If the voltage drop is too large, the amplifier 313 will clip (distort) the signal. Hence the image information cannot be processed. Subsequently, the switch 360 is activated and the charge collected on the photodiode/pixel capacitance 311, 350 will redistribute also to low sensitivity capacitor 351. The voltage swing on node A is thus reduced and the low sensitivity signal can pass through the amplifier 313 undistorted. High sensitivity range and low sensitivity range image readings are both combined in a suitable manner so the optimum signal to noise ratio is retained. The important aspect of the present invention is that the very same signal charge is used for both sensitivity ranges in order to allow weak signals of a single exposure to be readout with the high sensitivity and stronger signals of the same exposure to be read out with lower sensitivity, allowing for a large dynamic range without the lost of image information of the single exposure and also to avoid the loss of charge in the process. Both are requirements are inherent to medical x-ray imaging, wherein exposure of the patient to x-ray radiation that does not contribute to the imaging process should be avoided in x-ray imaginary in order to lower risk for the patient's health.

The step between high sensitivity range and low sensitivity range will be determined by the ratio of the voltage swing on node A to the acceptable voltage swing for the amplifier. This will typically be on the order of a factor 2.

FIG. 3b shows an implementation and driving scheme. The initial high level on line 322 activates the switch 312 in order to reset the sensor device. The initial high level on 340 allows the switch 360 to initialize the photodiode/pixel capacitances 350, 351. During the exposure the voltage level on node A is lowering with ongoing exposure time. Sequentially after the exposure the high level 324 initialises the high sensitivity range readout to take place. The high level on line 340 opens the switch 360 and allows the low sensitivity range readout. The sequentially high level on 324, and allows the low sensitivity read out to take place.

Figure 4A:
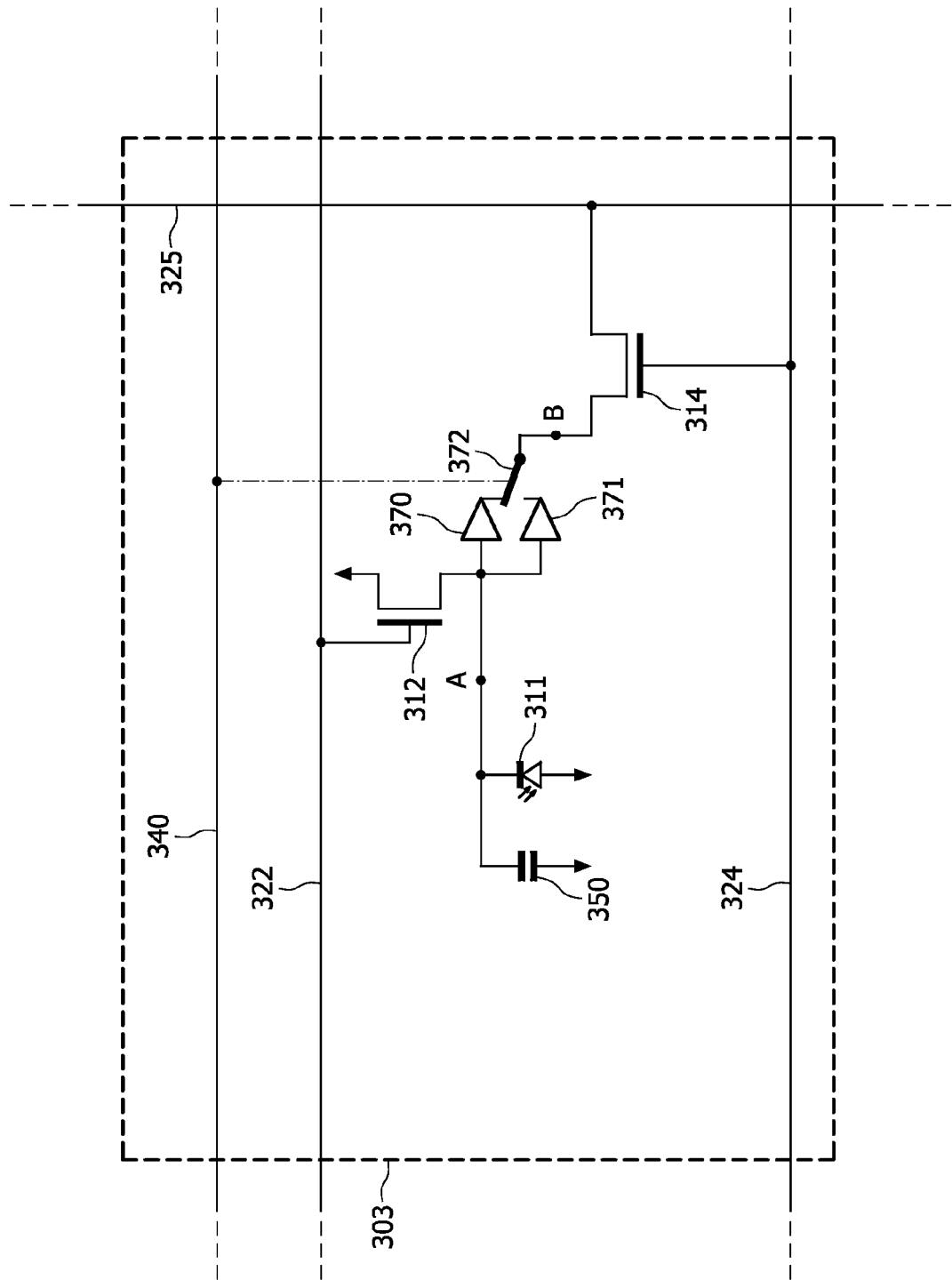
FIG. 4a is the second implementation of the high dynamic range x-ray detector pixel according to an embodiment of the present invention.
Figure 4B:
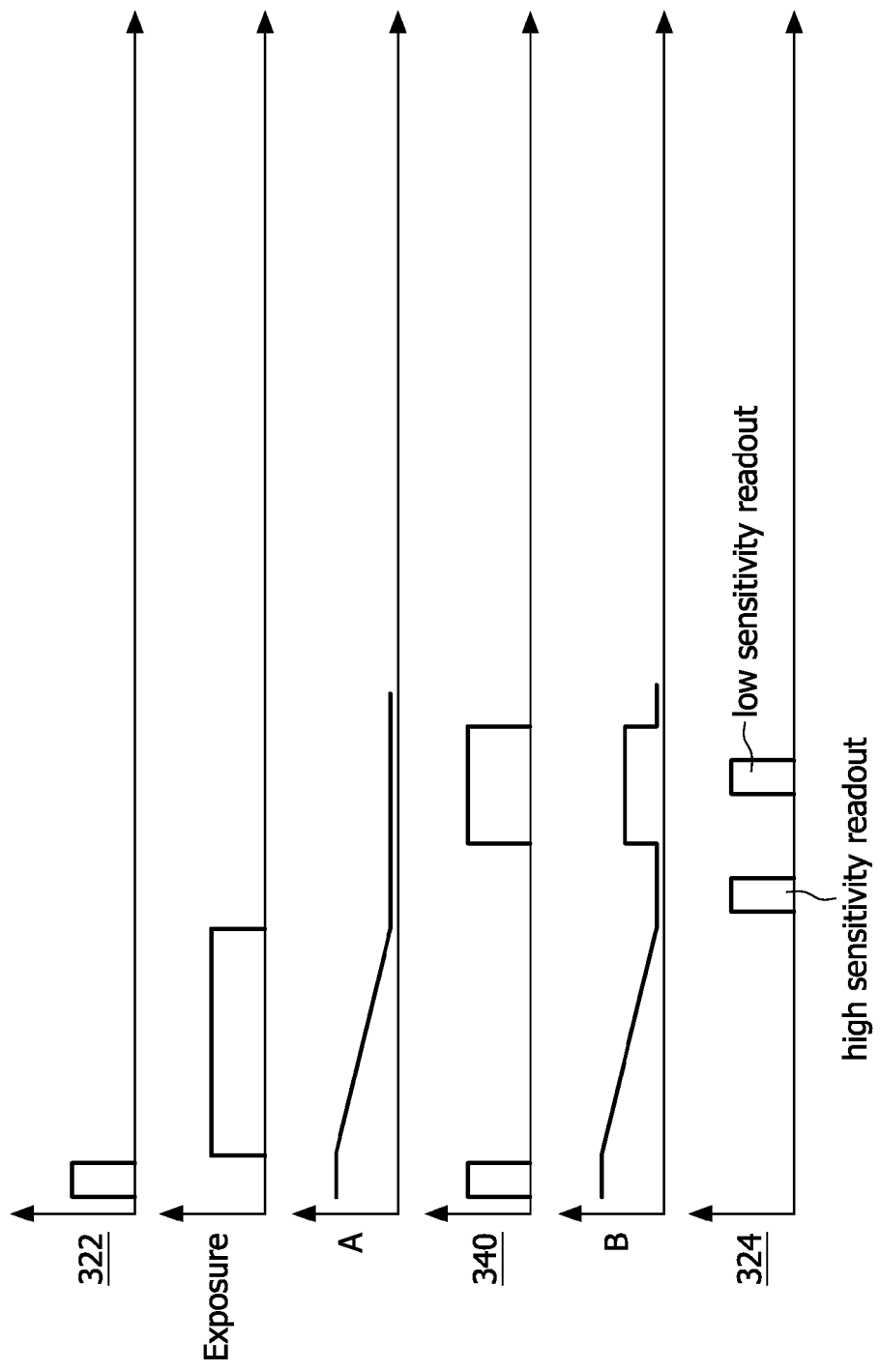

FIG. 4a and FIG. 4b show an alternative implementation and driving scheme. It makes use of a high sensitivity range and a low sensitivity range amplifier. The high sensitivity range amplifier 370 has, as already shown in the previous example, a limited acceptable voltage swing. Small signals are read through amplifier 370 in the first readout. For larger signals the amplifier will come into saturation, thus, distortion will occur and the signal at the sensor output is not valid. In the second readout, the low sensitivity range amplifier 371 is selected via the sensitivity select line 340. The lower sensitivity ensures that the signal passed through the following stages undistorted.

The step between high sensitivity and low sensitivity will be determined by the ratio of the voltage swing on node A to the acceptable voltage swing for the amplifier. This will typically be on the order of a factor 2. It is possible to choose the amplification factor arbitrarily, hence it is possible in case of choosing the amplification factor to 1, to leave out the amplifier in order to achieve a simplification of the circuitry.

Also referring to FIG. 4*b*, with the high level on 322 initialise is the switch 312, the photodiode 311, pixel capacitor 350 and low sensitivity capacitor 351 are reset prior to readout. Than the exposure takes place, and the charge collected during exposure leads to a voltage drop on node A. If the voltage drop is small enough (low exposure), it will pass through the readout amplifier 313 on the first, high sensitivity range readout. If the voltage drop is too large, the amplifier 313 will come into saturation and clip (distort) the signal. Hence the image information cannot be processed. Subsequently, the low sensitivity range amplifier 371 is selected via the sensitivity select line 340 triggering the switch 372. The voltage swing on node A is thus reduced and the low sensitivity signal can pass through the amplifier 313 undistorted. High sensitivity range and low sensitivity range image readings are both combined in a suitable manner so the optimum signal to noise ratio is retained.

Figure 5A:
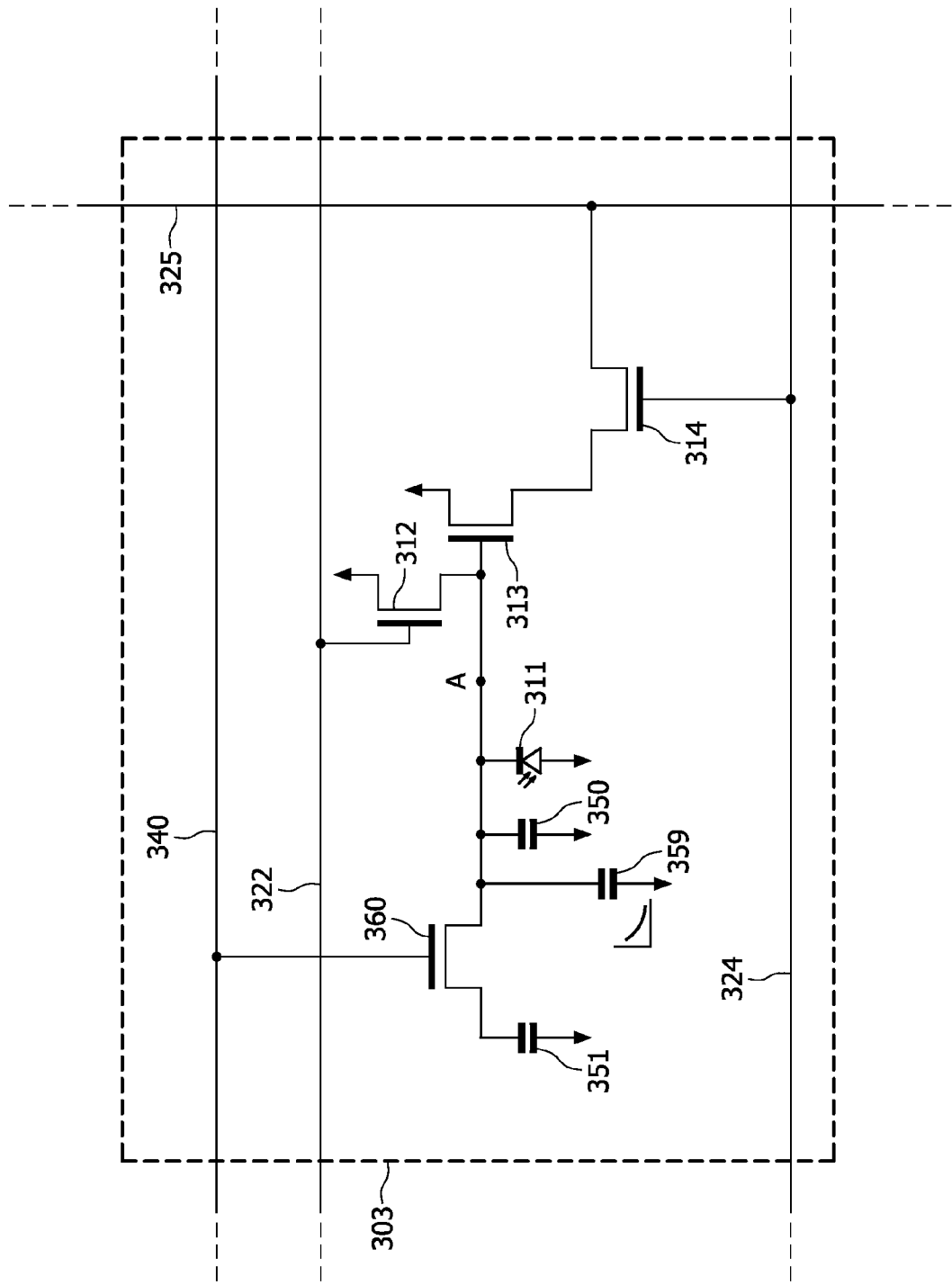
FIG. 5a is the third implementation of the high dynamic range x-ray detector pixel according to an embodiment of the present invention.

FIG. 5*a* shows an improved circuit based on the same principle as the one shown in FIG. 3*a*.

The transistor 360 is used as a switch at some times and as a charge transfer device at other times, therefore the term actuator device is used to cover both cases. A further description is given referring to FIG. 7*b*.

The improvement here is that a voltage dependent capacitance 359 is added to the photodiode node A. Preferably, the voltage dependent capacitor 359 has a low, constant capacitance when the pixel voltage on node A is in the acceptable range for the amplifier 313. As soon as the voltage drops lower than the acceptable voltage range, it is desirable that the capacitance of voltage dependent capacitor 359 increased sharply, thus providing increased storage capacity for the additional signal.

Referring also to FIG. 5*b*, small signals are read out undistorted in the first, high sensitivity readout. The high level on line 322 in connection to the high level on 340 triggers the switch 312 and the switch 360 to reset the photodiode 311, the capacitors 350, 351, and 359. The high level on 324 initialises first the high sensitivity read out. For the subsequent low sensitivity readout, the high level on 340 triggers the adding of a larger capacitor 351 by means of switch 360. During a longer exposure, large signals will be stored on the parallel connection of photodiode 311, pixel capacitance 350 and voltage dependent capacitor 359. The charges redistribute and the voltage drops to an acceptable level for amplifier 313. The reduced voltage also makes sure that the voltage dependent capacitor is sensitivity in the low, constant capacitance regime, so that is does not add nonlinearities in the readout.

The additional storage provided by the voltage dependent amplifier allows a larger step between high sensitivity and low sensitivity readout, a factor of 2 to 4 seems reasonable.

Figure 6A:
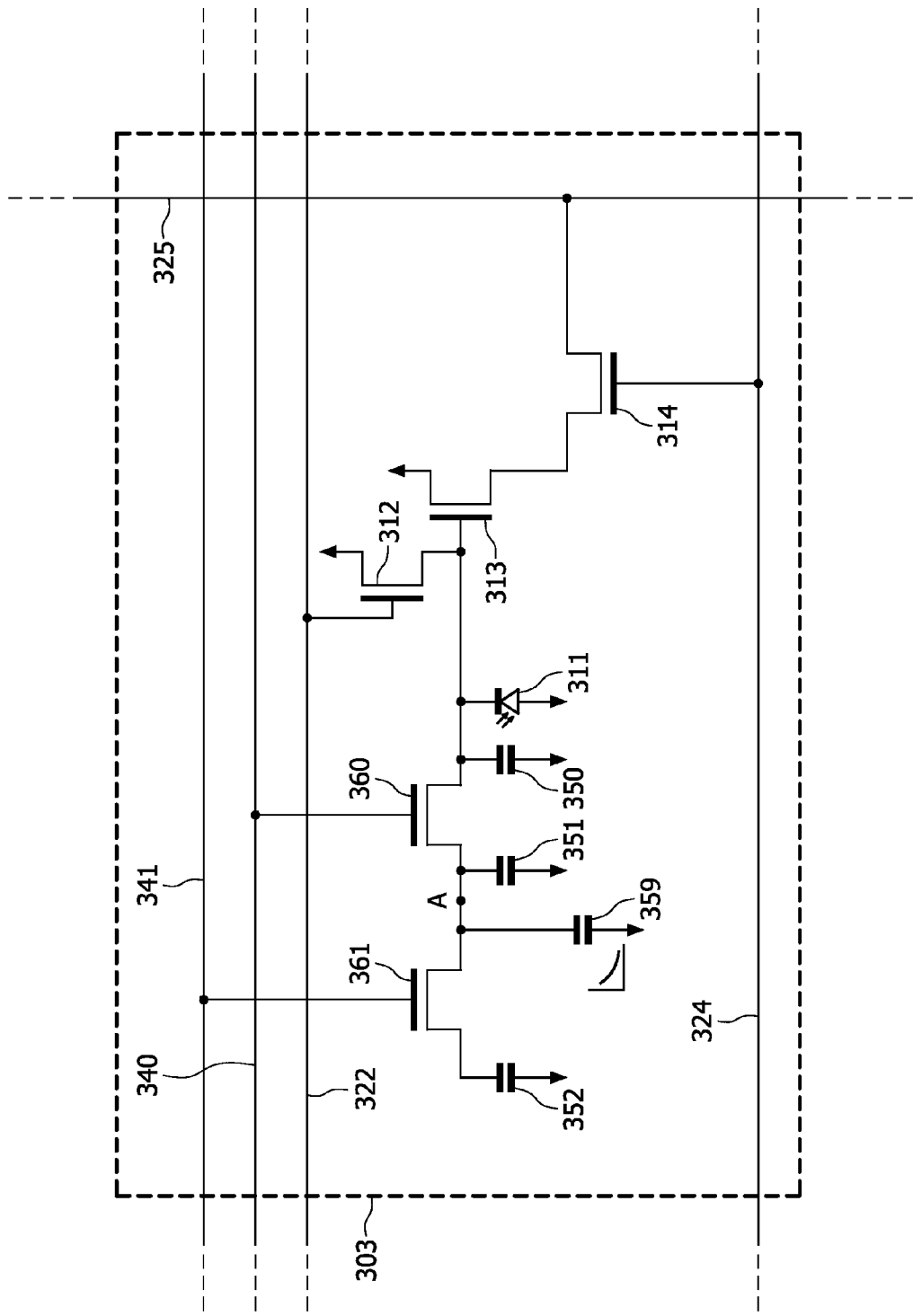
FIG. 6a is the fourth implementation of the high dynamic range x-ray detector pixel according to an embodiment of the present invention.

FIG. 6*a* shows and variant of the circuit in FIG. 5*a*. It provides a very high sensitivity setting that uses only a linear, small pixel capacitor 350. In this setting, there is no double readout available.

Via control line 340 and switch 360 additional constant and voltage dependent capacitances 351, 359 can be added to provide a first high sensitivity readout, followed by a low sensitivity readout after activating control line 341 and switch 361.

Figure 6B:
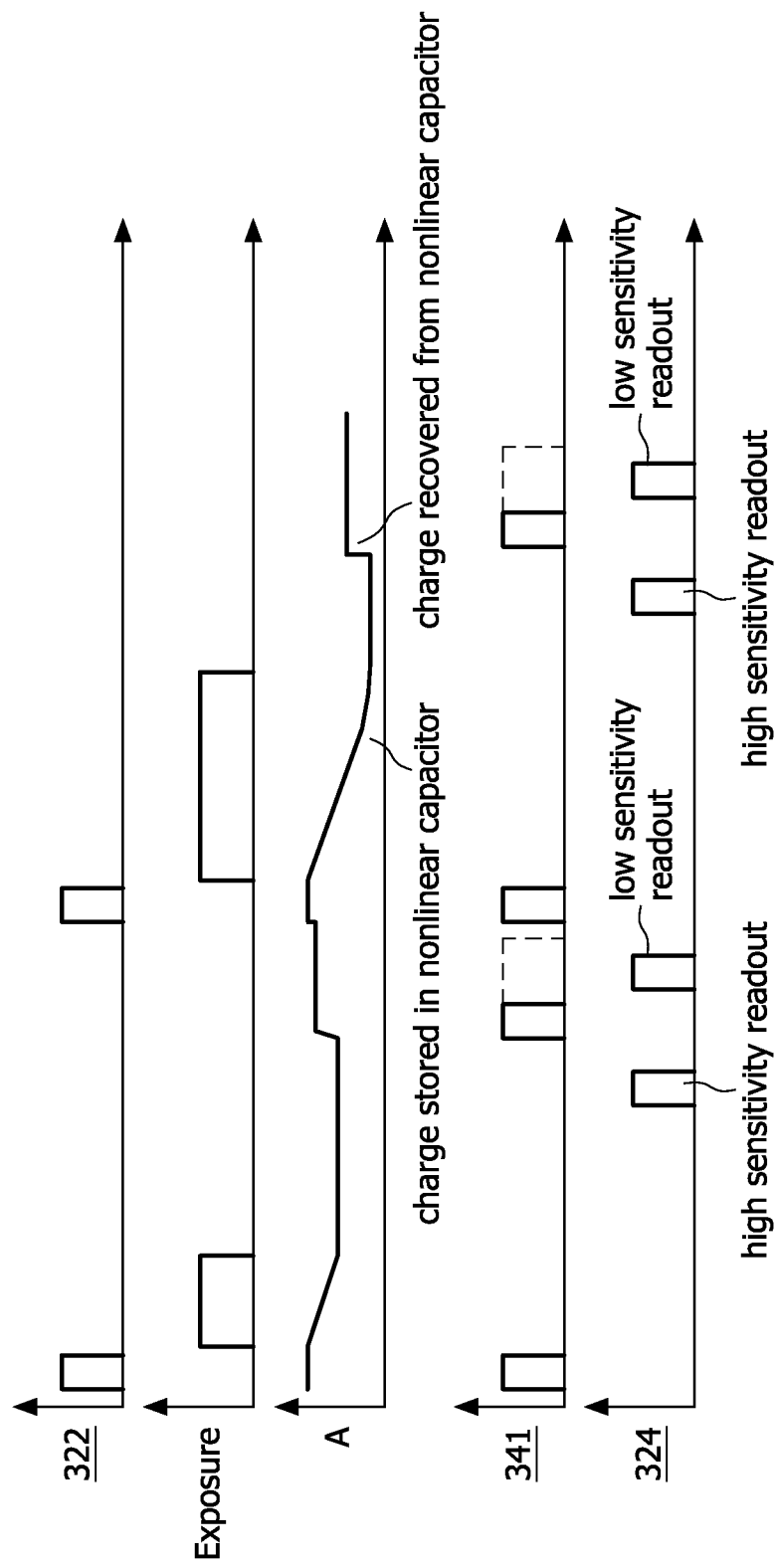

FIG. 6*b* gives the corresponding timing scheme for high sensitivity/low sensitivity readout which is similar to the one in FIG. 5*b*.

The additional storage provided by the voltage dependent amplifier allows a larger step between high sensitivity and low sensitivity readout, a factor of 2 to 4 seems reasonable.

Figure 7A:
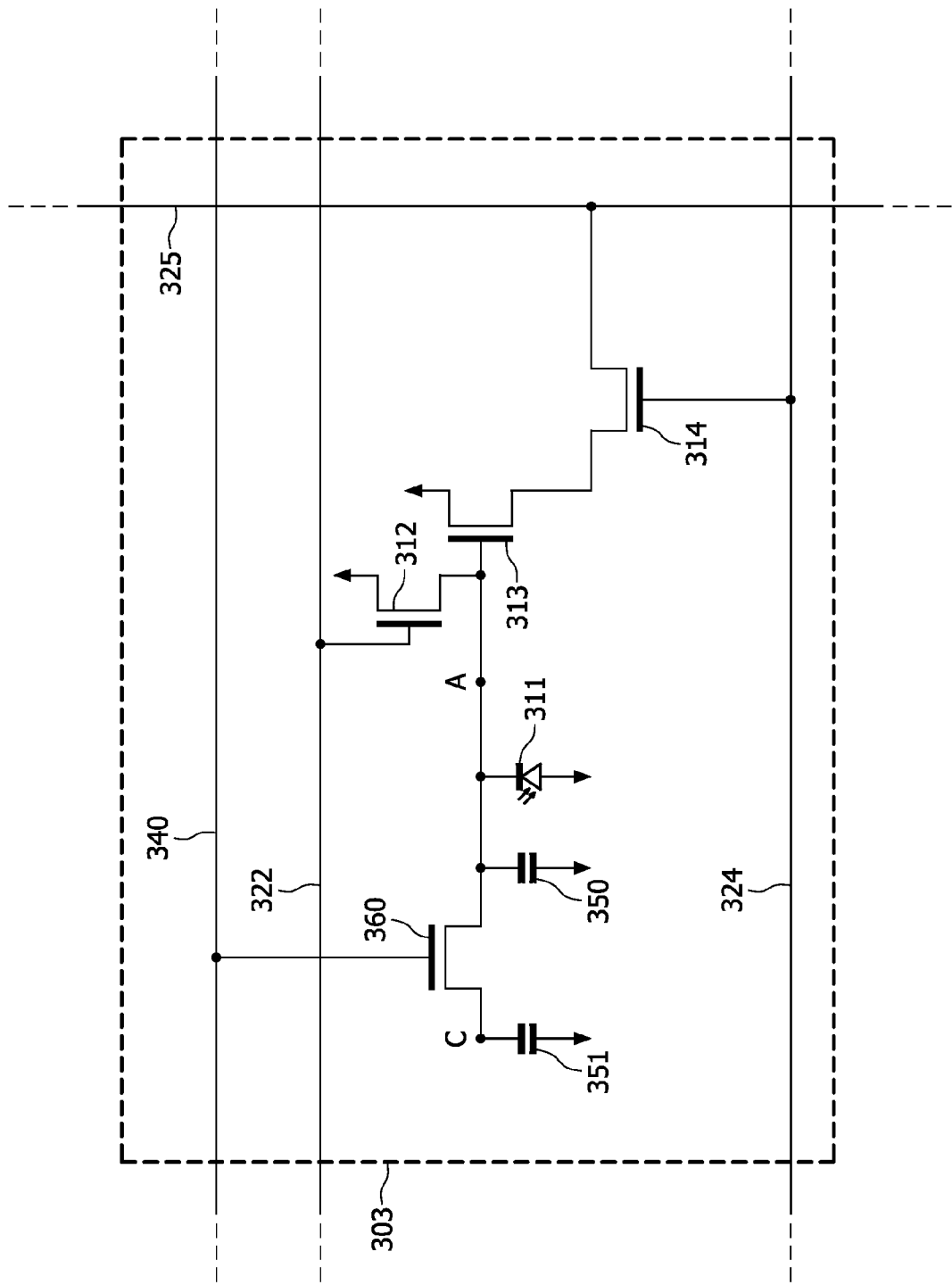
FIG. 7a is the fifth implementation of the high dynamic range x-ray detector pixel according to an embodiment of the present invention.

FIG. 7*a* gives an alternative implementation, that does not rely on voltage depended capacitors.

Hence it also avoids the possible nonlinearities associated with those devices.

Structurally, the circuit seems identical to FIG. 3*a*. However, transistor 360 is used as a switch at some times and as a charge pump at other times.

Figure 7B:
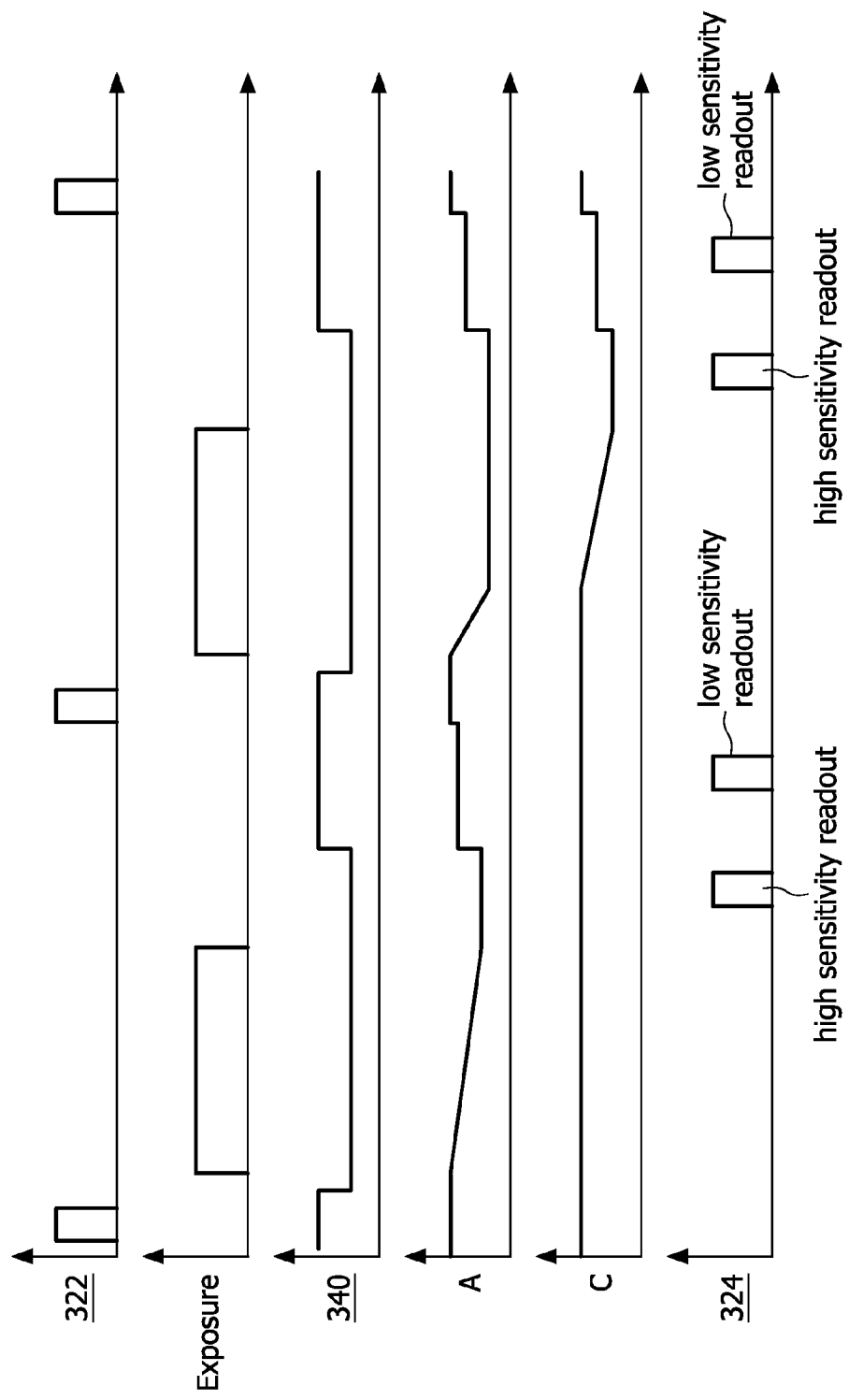

Referring to the timing scheme in FIG. 7*b*, the high level 340 triggers the transistor 360 which is fully switched on during the high level on 322 triggers a pixel reset, so that photodiode 311, pixel capacitor 350 and log sensitivity capacitor 351 are all fully charged.

Subsequently, the gate voltage 340 of transistor 360 is lowered to some intermediate level. As long as the source and drain nodes are more positive than the gate voltage minus the threshold voltage, the transistor 360 will be turned off and only photodiode 311 and pixel capacitor 350 determine the sensitivity. Small signals are handled in the high sensitivity determined by those capacitors (left part of FIG. 7*b*). Large signals will reduce the voltage on node A far enough to put the transistor 360 into conduction. The charge will flow from node A through transistor 360 to the node C and low sensitivity capacitor 351, the transistor is acting as a charge pump or charge transfer device (right part of FIG. 7*b*).

When the large exposure ends, the transistor will stop transferring charge from capacitor 350 to capacitor 351 as soon as the source voltage has reached the gate voltage minus the threshold voltage and the gate voltage of transistor 360 can be turned fully off (not shown) or being kept constant.

Subsequently, a first readout provides a correct reading of all pixels with small exposure levels. Pixels during large exposure times will show a constant signal, as all excess charges have been transferred to the low sensitivity capacitor 351.

Following the high sensitivity readout, the transistor 360 is fully turned on, effectively putting photodiode 311, pixel capacitor 350 and low sensitivity capacitor 351 in parallel. The charges redistribute and the resulting voltage can pass undistorted through amplifier 313.

The ratio of sensitivity ranges between high sensitivity and low sensitivity is only determined by the ratio of capacitances on node A to the capacitance on node C.

By tuning the transistor 360 fully on or off at all times, a fixed low sensitivity or high sensitivity setting can be achieved.

Figure 7C:
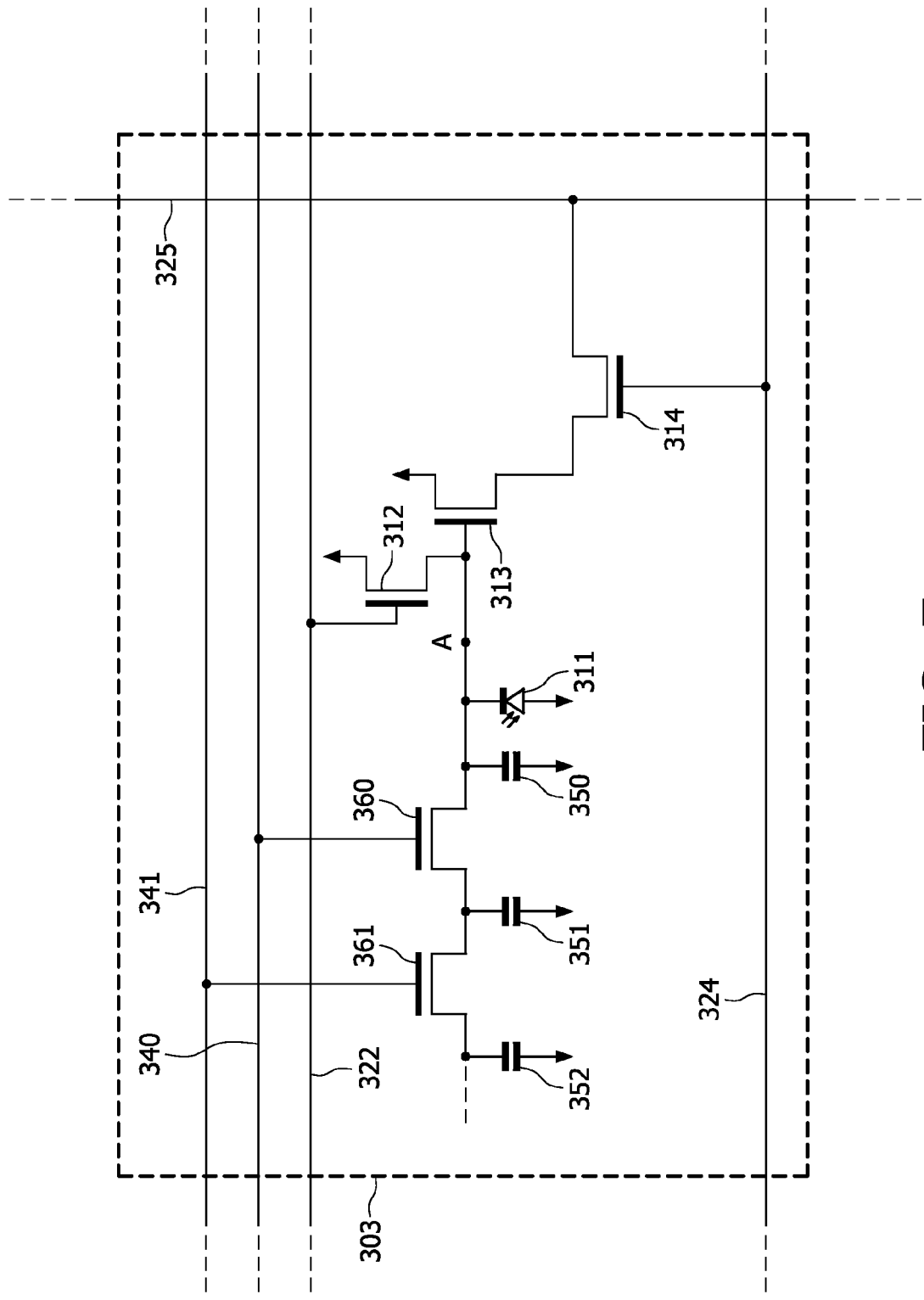
FIG. 7c is an alternative to the fifth implementation of the high dynamic range x-ray detector pixel according to an embodiment of the present invention.

In FIG. 7*c* the circuit from FIG. 7*a* is extended by adding one or more charge pump transistors/capacitors 361, 352, etc. to the basic circuit.

During exposure, the charge will first be stored on the photodiode 311 and pixel capacitor 350.

If pixel capacitor 350 is charged sufficiently, the excess charges will be transferred via transistor 360 to low sensitivity capacitor 351. When the lower sensitivity capacitor 351 becomes fully charged as well, the charge will be transferred by transistor 361 to very low sensitivity capacitor 352. The scheme can be extended.

A first readout will a sensitivity read the voltage of only the photodiode 311 and capacitor 350. For a second readout, transistor 360 is fully turned on. During a third readout also transistor 361 will be fully turned on. In this way a series of images from high to low sensitivity is obtained. The images need to be suitably combined.

Thus, during the exposure time the transistor 360 is defines an automatic sensitivity range controlling device for automatic controlling the conversion of incoming electromagnetic radiation into electric output quantity, and during the readout time, the transistor 360 is providing a selector device for selecting several sensitivity ranges during the readout time.

Figure 8A:
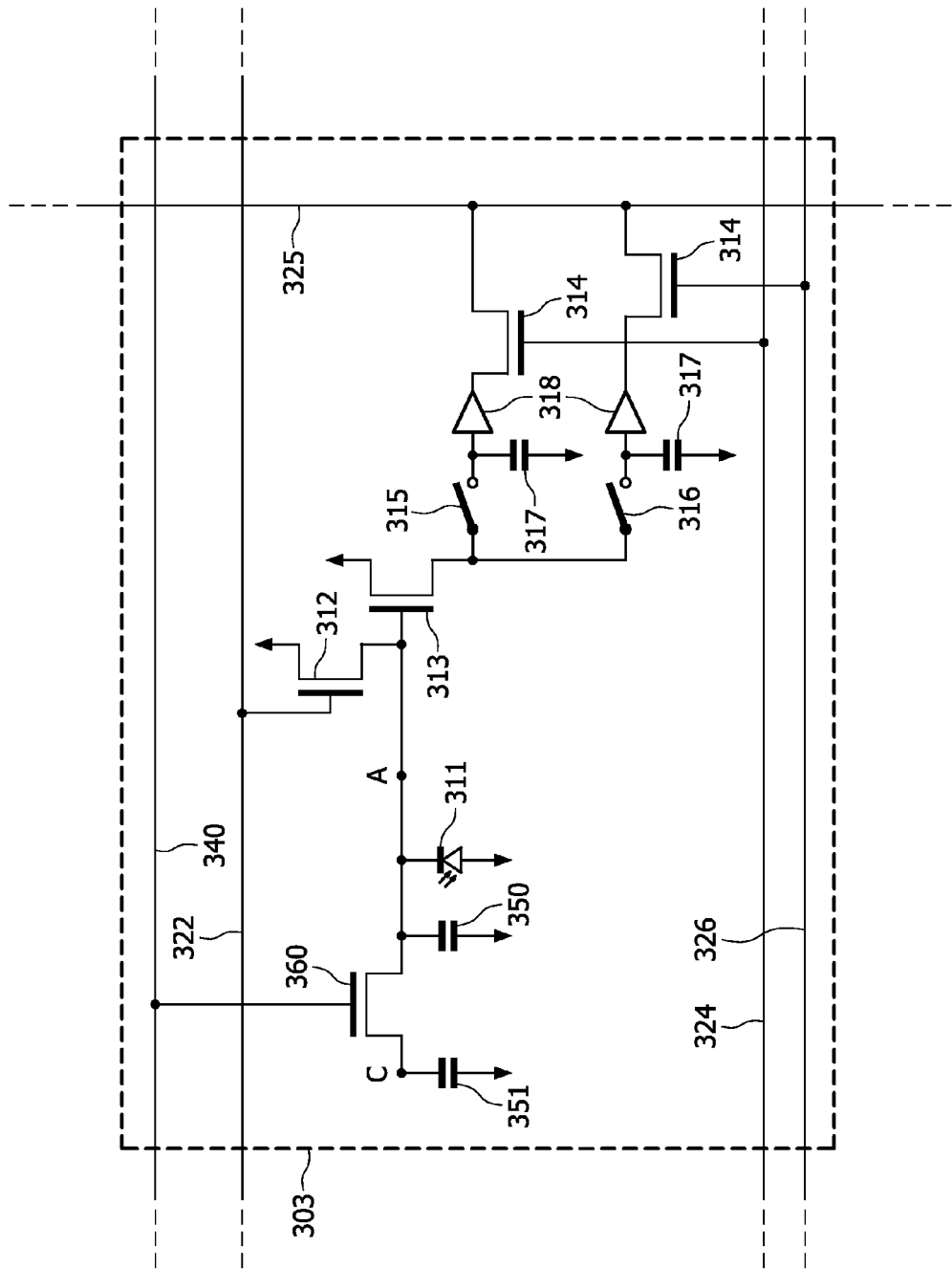
FIG. 8a is the sixth implementation of the high dynamic range x-ray detector pixel according to an embodiment of the present invention.

FIG. 8a shows a variant of FIG. 7a, which allows parallelizing the exposure and the readout.

In the circuit of FIG. 7a, after exposure one would typically read out the complete image in high sensitivity mode first, then turn the transistors 360 fully on and do the low sensitivity readout. The pixel voltage should not be changed by an additional exposure during the readout time. The readout time for a large image can be substantial, so that the image rate is significantly reduced.

From US20030011694 A1, a circuit is known that allows storing the voltage read from the photodiode in the pixel. This is done for all pixels in parallel, so it is very fast. Following this intermediate storage, the photodiode can be reset and the next exposure can start while the signals in intermediate storage can be read out.

FIG. 8a uses two intermediate storage devices 317 to store the high sensitivity and low sensitivity signals for all pixels in parallel and in rapid succession by activating switches 315 and 316 respectively. Following this, the photodiodes can be reset and the exposure restart. Concurrently, the high sensitivity image and low sensitivity image can be read out by activating the associated readout switches 314 over row select lines 324 and 326, respectively.

Figure 8B:
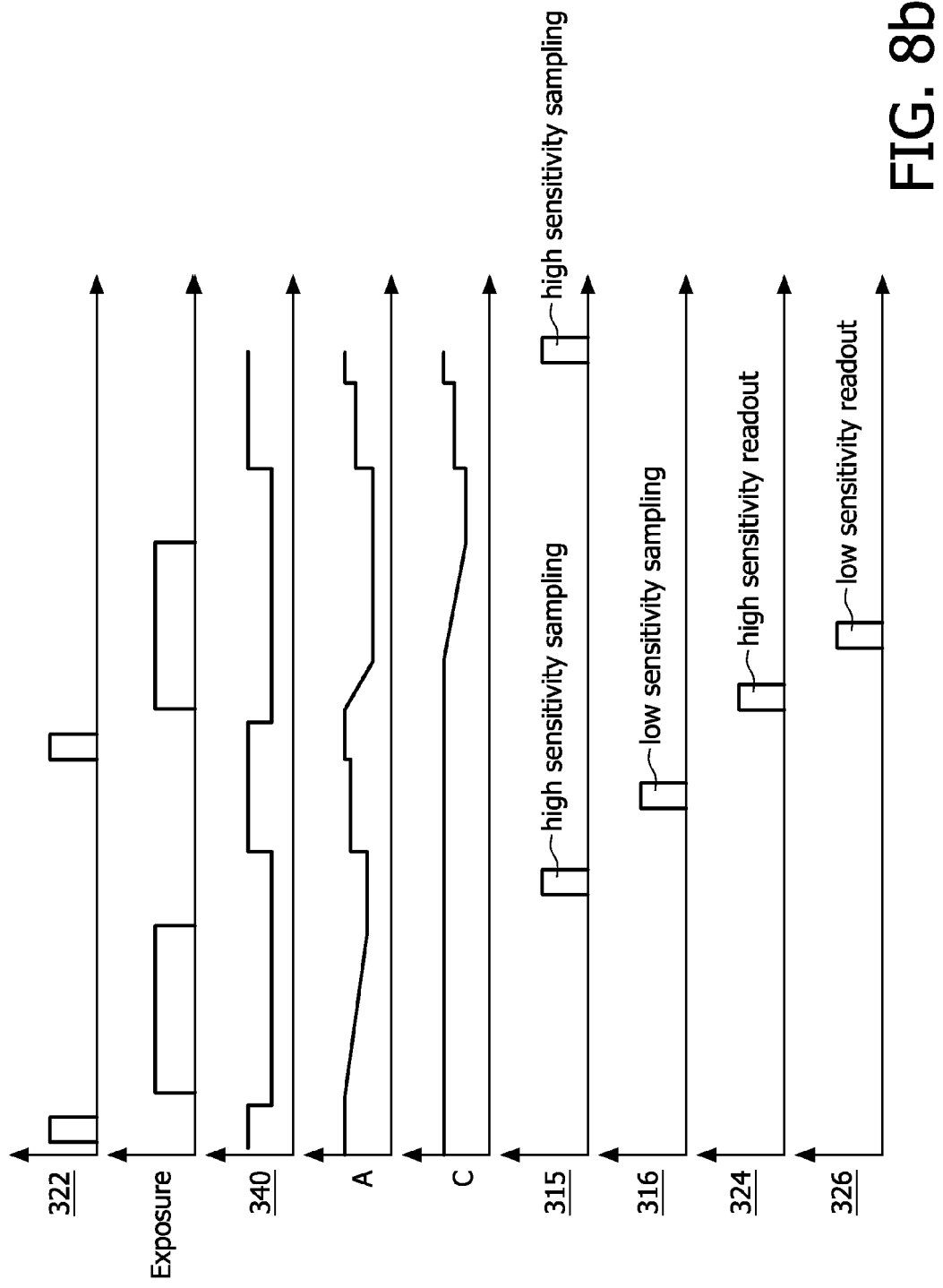

FIG. 8b gives the corresponding timing scheme. The high level 340 triggers the transistor 360 which is fully switched on during the high level on three and the 22 triggers a pixel reset, so that photodiode 311, pixel capacitor 350 and log sensitivity capacitor 351 are all fully charged.

Subsequently, the gate voltage 340 of transistor 360 is lowered to some intermediate level. As long as the source and drain nodes are more positive than the gate voltage minus the threshold voltage, the transistor 360 will be turned off and only photodiode 311 and pixel capacitor 350 determine the sensitivity. The row select lines 315 and 316 allow the triggering of the sample and hold circuit, which transfers the charges to the capacitors 317, respectively. Thus, the next exposure can take place during the high sensitivity read out on line 324 and the low sensitivity readout on the row select line 324 is triggered. Small signals will see the high sensitivity determined by those capacitors (left part of FIG. 7b). Large signals will reduce the voltage on node A far enough to put the transistor 360 into conduction. The charge will flow from node A through transistor 360 to the node C and low sensitivity capacitor 351, the transistor is acting as a charge pump (right part of FIG. 7b).

When the large exposure ends, the transistor will stop transferring charge from capacitor 350 to capacitor 351 as soon as the source voltage has reached the gate voltage minus the threshold voltage and the gate voltage of transistor 360 can be turned fully off (not shown) or being kept constant.

Subsequently, a first readout provides a correct reading of all pixels with small exposure levels. Pixels during large exposure times will show a constant signal, as all excess charges have been transferred to the low sensitivity capacitor 351.

Following the high sensitivity readout, the transistor 360 is fully turned on, effectively putting photodiode 311, pixel capacitor 350 and low sensitivity capacitor 351 in parallel. The charges redistribute and the resulting voltage can pass undistorted through amplifier 313.

The ratio of sensitivity ranges between high sensitivity and low sensitivity is only determined by the ratio of capacitances on node A to the capacitance on node C.

By tuning the transistor 360 fully on or off at all times, a fixed low sensitivity or high sensitivity setting can be achieved. The row select lines 315 and 316 allow the triggering of the sample and hold circuit, which transfers the charges to the capacitors 317, respectively. Thus, the next exposure can take place during the high sensitivity read out on line 324 and the low sensitivity readout on the row select line 324 is triggered.

It is clear that the actual readout can be in parallel to the next exposure.

Suitable control lines for switches 315 and 316 are needed.

Figure 9A:
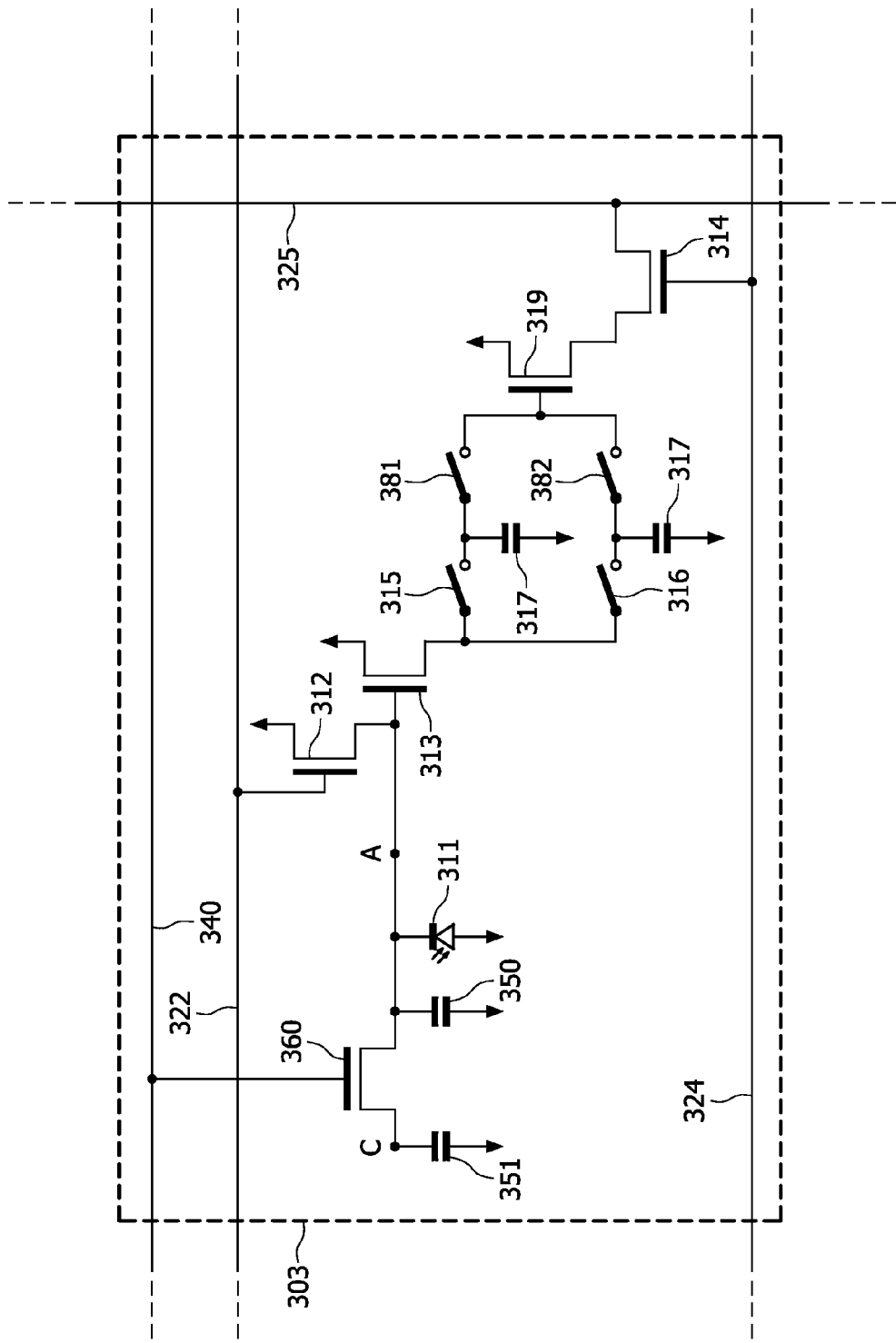
FIG. 9a is the seventh implementation of the high dynamic range x-ray detector pixel according to an embodiment of the present invention.

FIG. 9a gives an alternative circuit to serve the same purpose as the one described in FIG. 8a.

Here both intermediate storage devices 317 can be readout sequentially over one output amplifier 319 and one readout-switch 314. Suitable control lines for switches 315, 316, 381 and 382 are needed.

Figure 9B:
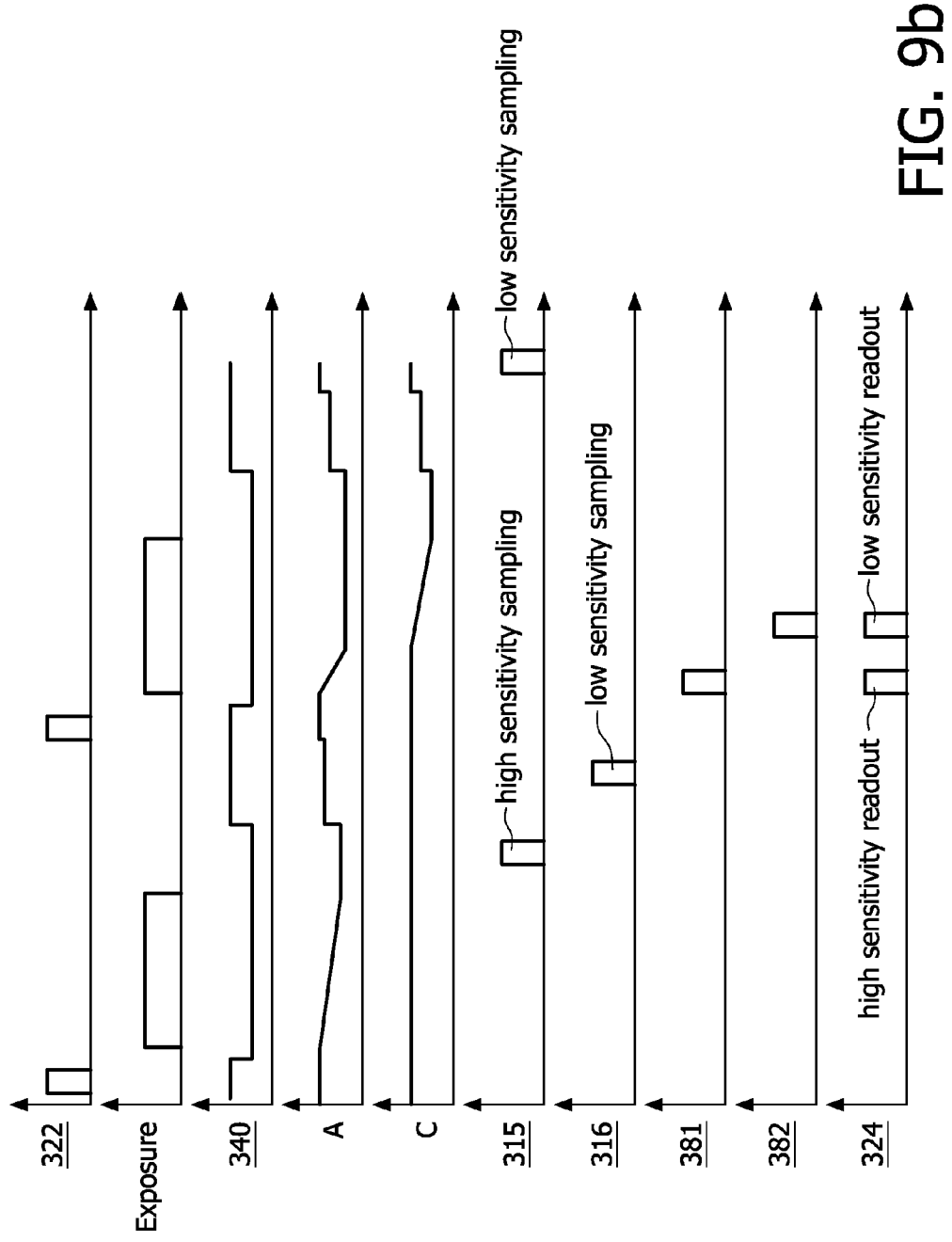

FIG. 9b gives the corresponding timing scheme with reference to FIG. 8b.

Figure 10:
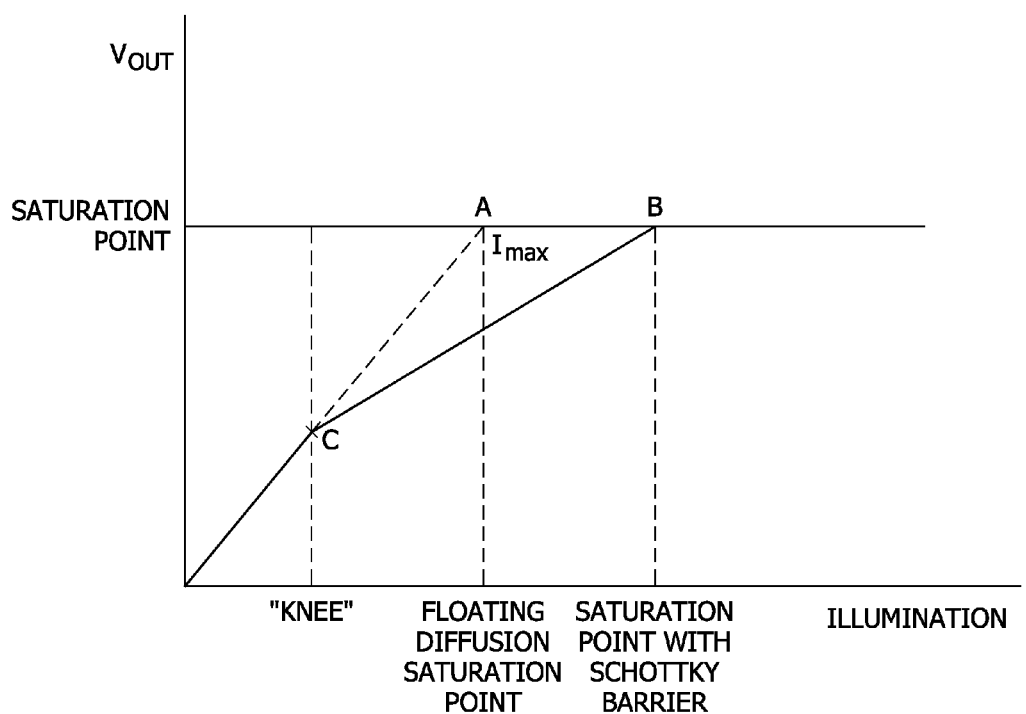
FIG. 10 is a chart of illumination vs. output voltage Vout which shows the characteristics of a prior art radiation detection device.

FIG. 10 is a chart of illumination vs. output voltage Vout which shows the characteristics of a prior art radiation detection device. This device operated in the lower range wherein the operational characteristic shows the first inclination until reaching a voltage threshold at point C and an operational characteristic of the second inclination. In point C the operation characteristics has a discontinuity.

FIG. 11a and FIG. 11b show schematically two charts of illumination vs. outgoing signal according to the present invention. FIG. 11a is the charge for a low sensitivity range and FIG. 11b is the chart the for the high sensitivity range. The operation point characteristic is defined as the ratio between the amount of incoming radiation and the outgoing output quantity. The operation characteristic in both cases is continuous in the operational range, wherein the operational range refers to all operational points from zero until saturation.

Although the circuits shown here use voltage readout, the same principle can also be used with charge readout from the gate node of the first source follower 313.

The photodiode 311 is used with indirect x-ray converters, however for direct converters, e.g. photo conductors, it may be replaced by a charge collection electrode. In another embodiment the circuits can be build using crystalline, polycrystalline or amorphous semiconductors.

For image combining of several images of different ranges, the high sensitivity and low sensitivity images might to be matched, preferable with some overlap, to give one continuous, large dynamic range output image Although modifications and changes may be suggested by those skilled in the art, it is the intention of the inventor to embody within the patent warranted hereon all changes and modifications as reasonably and properly come within the scope of his contribution to the art.

The invention claimed is:

1. A radiation detector pixel for x-ray radiation, comprising:
    a sensor device, and at least one readout amplifier, wherein the sensor device comprises at least one actuator device as an automatic sensitivity range controlling device for controlling a conversion of incoming electromagnetic radiation into electric output quantity; and
    wherein the at least one actuator device is adapted to allow a signal charge of a single exposure to be read out with at least two sensitivity ranges, by:
        shifting electric charges between a first capacitance and a second capacitance of the radiation detector pixel, and/or;
        selecting a high sensitivity range amplifier or a low sensitivity range amplifier of the radiation detector pixel; and
    wherein for each of the at least two sensitivity ranges, a ratio between the incoming electromagnetic radiation and the electric output quantity is continuous in an operational range, wherein the operational range refers to all operational points from zero until saturation; and wherein the at least one actuator device is implemented on the radiation detector pixel.

2. The radiation detector pixel according to claim 1, wherein the sensor device comprises a photo sensor device and at least one capacitance.

3. The radiation detector pixel according to claim 1, wherein the at least one actuator device is a FET or any other type of transistor.

4. The radiation detector pixel according to claim 1, wherein the at least one actuator device in combination to the first and second capacitances provides a charge pump circuit.

5. The radiation detector pixel according to claim 1, wherein the at least one actuating device controls the sensitivity range of an output voltage potential of the radiation detector pixel.

6. The radiation detector pixel according to claim 4, wherein the charge pump circuit is coupled with at least one sample and hold circuitry.

7. The radiation detector pixel according to claim 1, wherein at least one of the radiation detector pixel for x-ray radiation is provided in a radiation detector system.

8. The radiation detector pixel for x-ray radiation as claimed in claim 1, wherein the at least one actuator device allows conveying of electric charges between a storing circuitry, in which the conveying is determined by a ratio between a drain source voltage and an external control voltage minus a gate voltage.

9. A computer program stored on a non-transitory computer storage medium for controlling a radiation detector system, which provides control signals for controlling the radiation detector pixel circuitry with multiple operation sensitivity ranges as claimed in claim 1.

10. A non-transitory computer storage medium comprising a computer program for controlling a radiation detector system, which provides control signals for controlling the radiation detector pixel circuitry with multiple operation sensitivity ranges as claimed in claim 1.

* * * * *